July 1, 1952     F. R. SWANSON ET AL     2,601,811
MACHINE TOOL
Filed May 6, 1949     6 Sheets-Sheet 1

Inventors
Fred R. Swanson.
Walter S. Swanson.
Robert E. Wiley.
By Schroeder, Merriam, Hofgren & Brady
Attorneys.

Inventors.
Fred R. Swanson.
Walter S. Swanson,
Robert E Wiley.

July 1, 1952 F. R. SWANSON ET AL 2,601,811
MACHINE TOOL
Filed May 6, 1949 6 Sheets-Sheet 4

Inventors
Fred R. Swanson,
Walter S. Swanson
Robert E. Wiley.
By Schroeder, Merriam, Hofgren & Brady
Attorneys

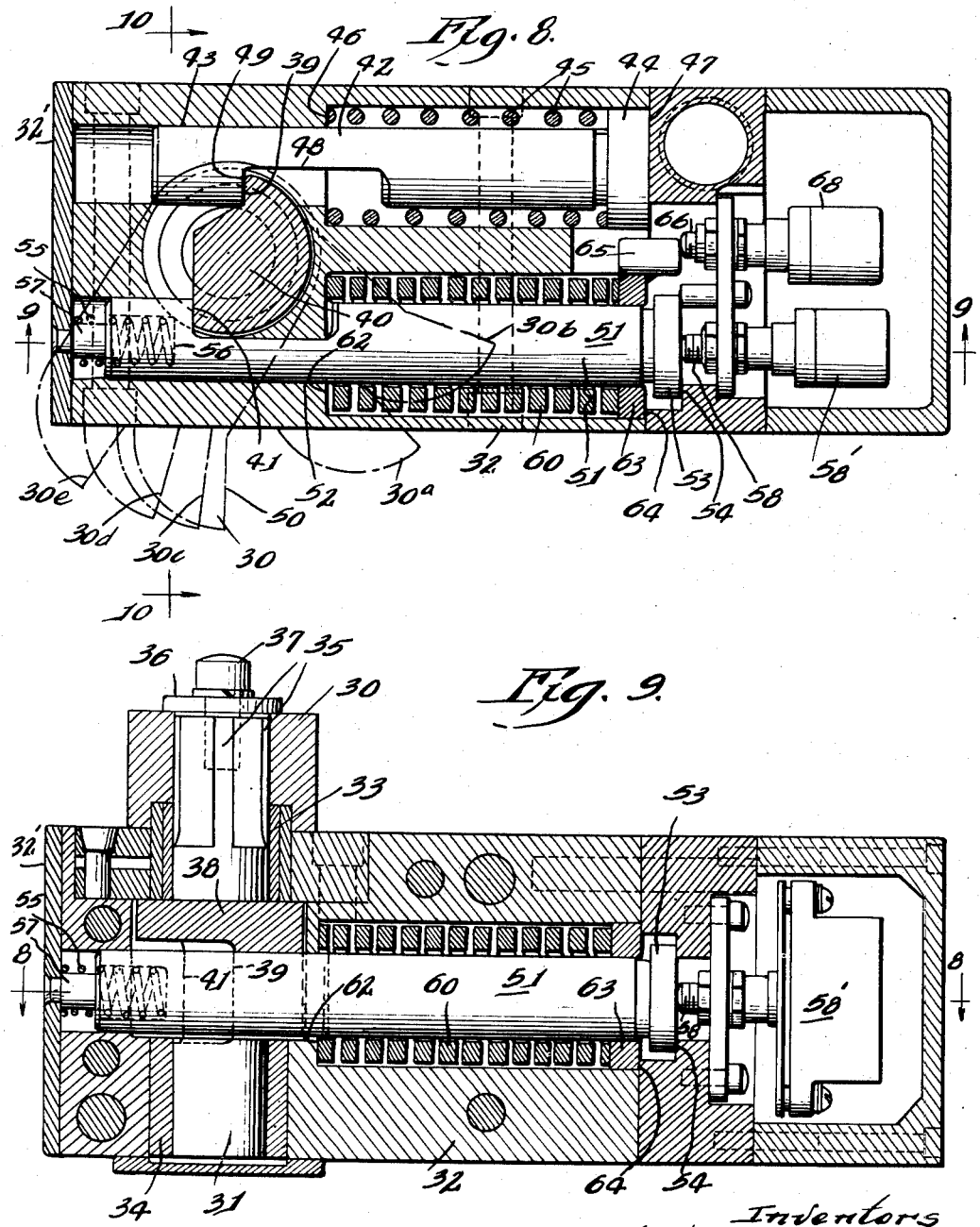

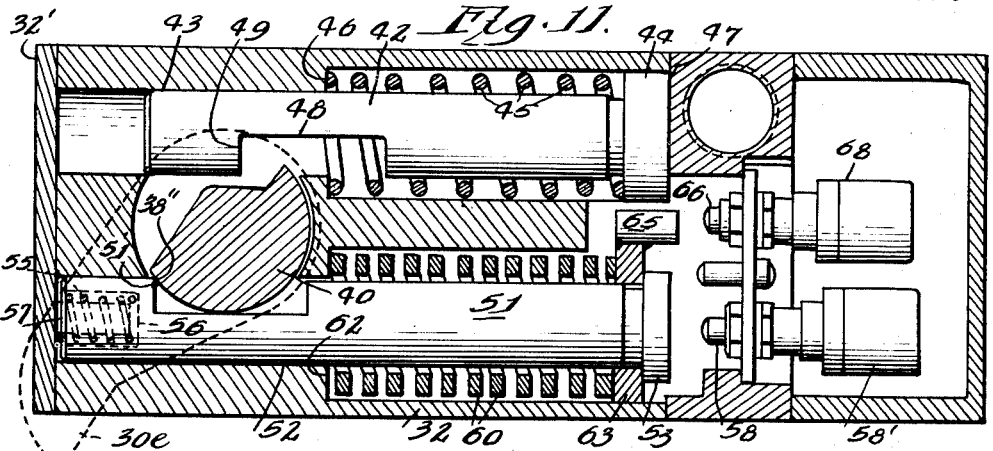
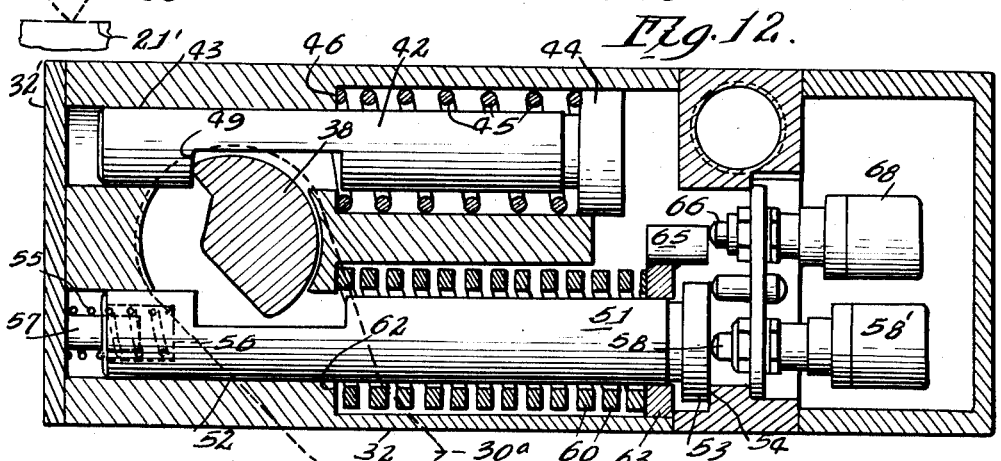
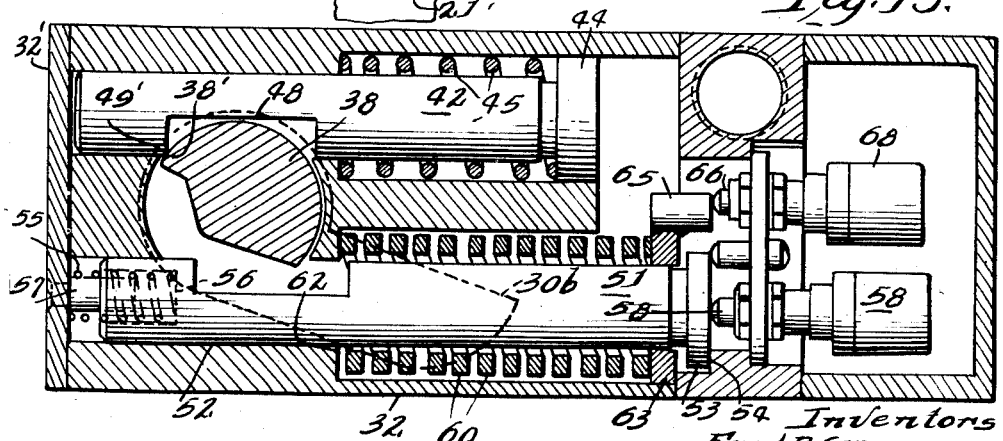

Patented July 1, 1952

2,601,811

UNITED STATES PATENT OFFICE 2,601,811

MACHINE TOOL

Fred R. Swanson, Walter S. Swanson and Robert E. Wiley, Rockford, Ill., assignors to Sundstrand Machine Tool Co., Rockford, Ill., a corporation of Illinois Application May 6, 1949, Serial No. 91,848

20 Claims. (Cl. 90—21)

More particularly the invention relates to a machine tool in which workpieces are moved automatically from a loading station to a cutting station and thereafter are moved out of the cutting station to make way for succeeding workpieces.

It is the general object of the invention to provide a new and improved machine tool of such character.

Another object is to provide a machine tool having a plurality of work stations, a movably mounted cutter support carrying a cutter for operating on a workpiece when it is at an intermediate or cutting station, and means carried on the cutter support and operable as the cutter support moves through a return stroke after a cutting operation to move a fresh workpiece into the cutting station and to move a finished workpiece away from the cutting station.

Another object is to provide such a machine tool with novel dog mechanisms carried by the cutter support for so moving workpieces, which dog mechanisms are yieldable to release a workpiece during movement thereof in the event an obstruction is encountered.

Further objects will become readily apparent from the following detailed description taken in connection with the accompanying drawings wherein:

Fig. 8 is a horizontal section along the line 8—8 of Fig. 9;

Fig. 9 is a vertical section along the line 9—9 of Fig. 8;

Figs. 11, 12 and 13 are views similar to Fig. 8 with the dog indicated in different operative positions.

Figure 1:
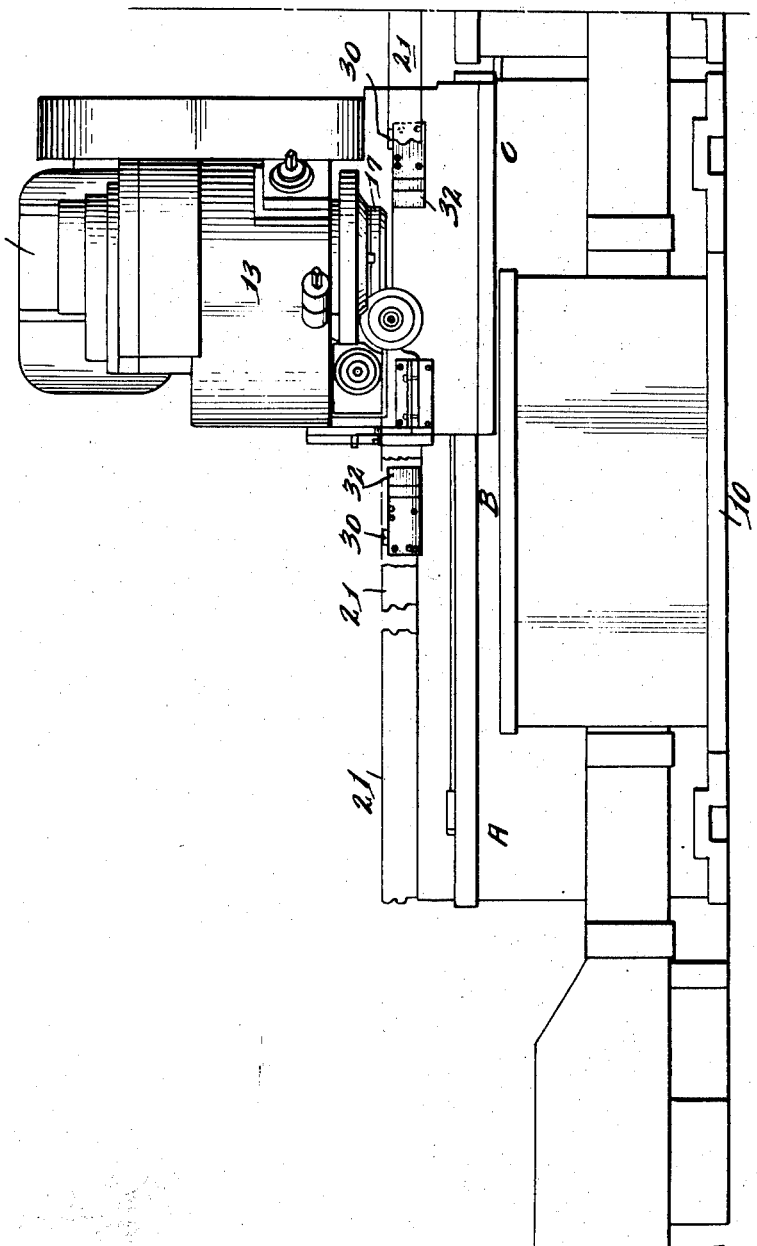
Fig. 1 is a front elevational view of a milling machine embodying a preferred form of the invention.

While there is shown in the drawings and herein described in detail a preferred form of the invention embodied in a milling machine, it is not intended to limit the invention to the particular machine or arrangement shown. The scope of the invention will be pointed out in the appended claims.

In the form selected for purposes of disclosure, the invention is embodied in a travelling head type of milling machine having a base 10 provided with longitudinally extending guideways 11 and 12 on which a travelling cutter head 13 is slidably mounted for reciprocatory movement as by means of a hydraulic cylinder 14 secured to the base and a piston 15 carried on a rod 16 suitably secured to the cutter head. The cutter head carries a vertically positioned cutter spindle having at its lower end a cutter 17, the spindle being driven by suitable intervening mechanism from a drive motor 18 carried on the head. A hydraulic pump mechanism indicated generally at 20 of well-known design may be used with suitable intervening conduits and control valves for effecting automatic reciprocation of the cutter head 13, but as the detailed construction of such hydraulic mechanism does not form a part of this invention, it will suffice to refer to the piston and cylinder device as a means for reciprocating the cutter head.

The machine herein illustrated is arranged to have the cutter 17 thereon surface one face of a workpiece 21 herein shown as a cylinder head for an internal combustion engine. The machine is provided with suitable parallel guides 22 at a work receiving or loading station A, guides 23 at a cutting station B, and additional guides 24 leading away from the cutting station to the discharge station C. With a workpiece 21, for example, at the cutting station B, it is contemplated that the cutter head 13 will move toward the left (Figs. 1 and 2) to perform a cutting operation on the workpiece. It is general practice in such milling operations to have the cutter head move rapidly toward the workpiece until the cutter is about to commence cutting, after which the cutter head is moved at a slower or cutting speed during the cutting operation. When the cutter has completely traversed the workpiece the cutter head reciprocating means is reversed and the cutter head is returned to the position shown at a relatively rapid rate.

The invention is directed to a mechanism for moving workpieces through the machine, each workpiece being moved first from the loading station A to the cutting station B where a cutting operation is performed thereon. Upon completion of the cutting operation the workpiece is moved from the cutting station B to the discharge station C. During continuous operation of the machine, with the moving of a fresh workpiece from A to B, a finished workpiece is simultaneously moved from B to C. It is intended that the machine, at the cutting station B, will be provided with suitable mechanisms (not shown) for locating and clamping a workpiece to the base during a cutting operation and that the locating and clamping mechanisms will be operated automatically in proper timed relation to the movements of the cutter head. Such mechanisms are not shown herein as it is believed they are unnecessary to an understanding of the present invention.

Figure 2:
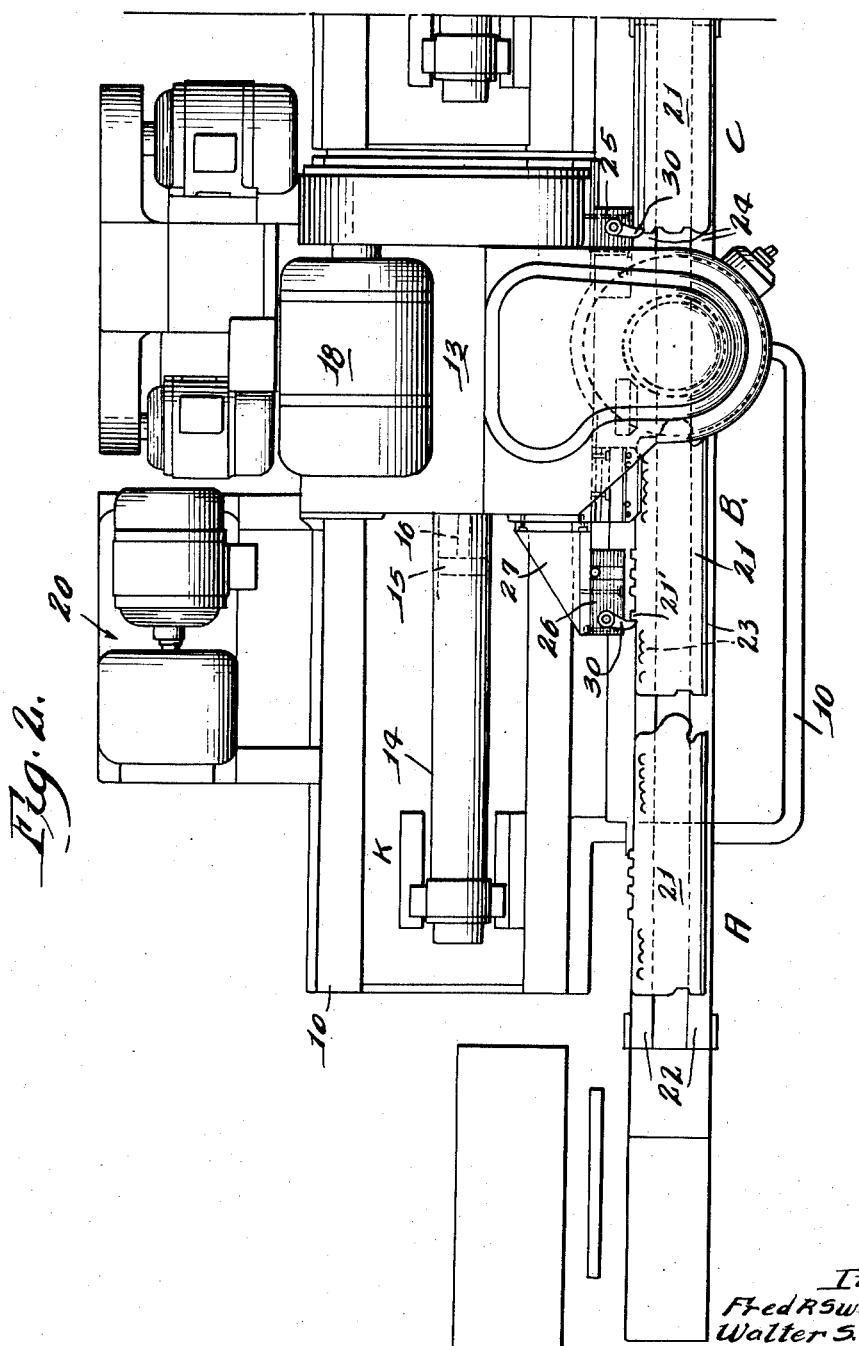
Fig. 2 is a plan view thereof.
Figure 3:
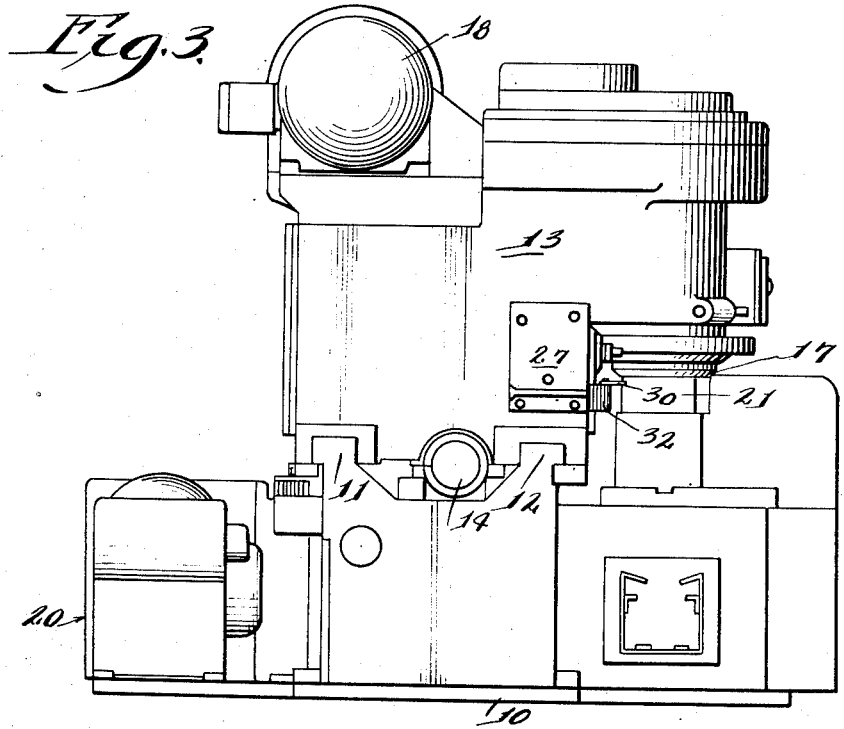
Fig. 3 is an elevational view looking at the left-hand end of Fig. 1.
Figure 10:
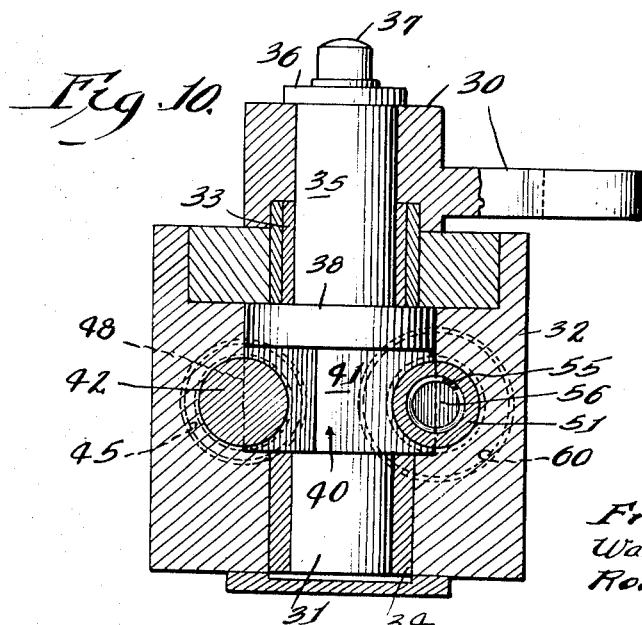
Fig. 10 is a section along line 10—10 of Fig. 8.
Figure 4:
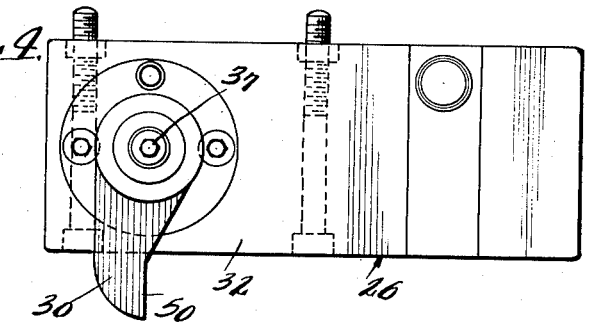
Fig. 4 is an enlarged plan view of a trailing dog device.
Figure 5:
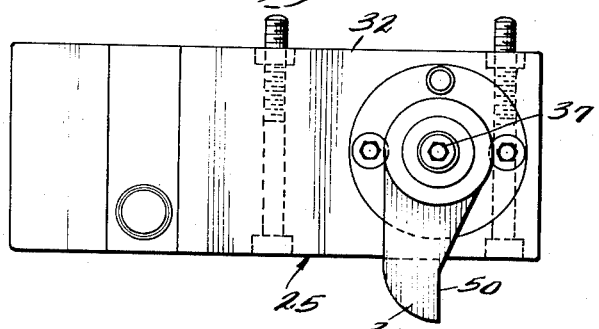
Fig. 5 is a similar view of an advance dog device.
Figure 6:
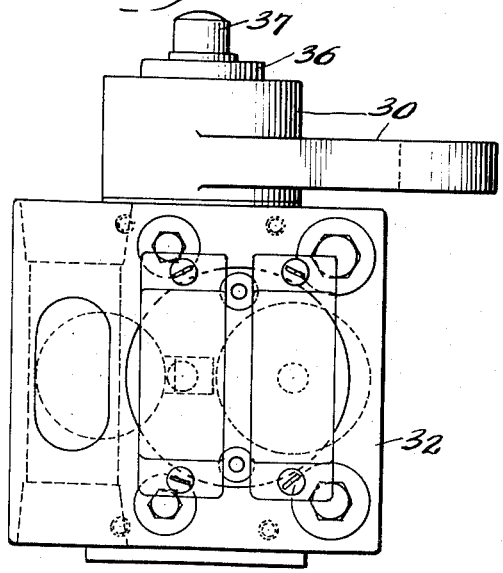
Fig. 6 is a vertical end view looking at the left-hand end of Fig. 9.
Figure 7:
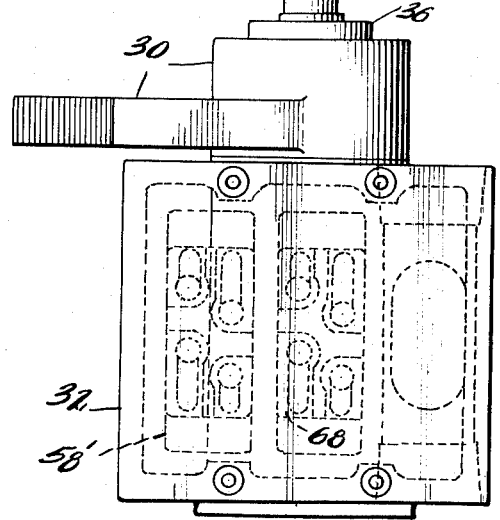
Fig. 7 is a vertical end view looking at the right-hand end of Fig. 9.

As shown herein, the mechanism for feeding the workpieces from one station to the next comprises an advance dog device 25 and a trailing dog device 26 suitably bolted to and carried on the cutter head 13. As shown best in Fig. 2, the dog device 25 is bolted directly to the cutter head and the dog device 26 is bolted to a bracket 27 which in turn is secured to the cutter head. Each dog device includes a dog 30 which extends horizontally and in a forward direction (transverse to the line of movement of the workpieces from station to station) from the upper end of a vertical shaft 31 to which it is secured, the shafts 31 being suitably supported in casings 32. As the dog devices are substantial duplicates with the exception that one has its dog located adjacent the left-hand end of its casing, as shown in Figs. 2 and 4, and the other has its dog located adjacent the right-hand end of its casing as shown in Figs. 2 and 5, only the dog device 26 of Fig. 4 has been illustrated in more detail in Figs. 6–9 and will now be described.

As shown in Fig. 9, the shaft 31 is supported with its axis extending vertically in sleeve bearings 33 and 34 in the casing 32 and is splined at its upper end at 35 to receive the dog 30. A suitable washer 36 and screw device 37 are provided to secure the dog firmly to the shaft so that normally the dog extends transversely of the line of movement of the workpieces from station to station, as shown in full lines in Figs. 4 and 5. The shaft has an enlarged cylindrical portion 38 intermediate the bearings 33 and 34. This portion is partly cut away as shown best in Figs. 8 and 9, to provide a transversely extending abutment surface 39 rearwardly of the shaft axis 40 (above it in Fig. 8) and another transverse abutment surface 41 forwardly of the shaft axis (below it in Fig. 8). A horizontally extending plunger 42 is slidable in a bore 43 in the casing 32 and is provided with a head 44 at its right-hand end (Fig. 8). A coil spring 45 surrounding the plunger and located between the head 44 and an abutment surface 46 on the casing functions to urge the plunger towards the right to a position wherein the head is stopped by an end surface 47. The plunger is provided with a transverse slot 48 to provide a transverse surface 49 adapted to engage the abutment surface 39 on the shaft 31. Thus, the spring 45 functions normally to hold the shaft 31 and the dog 30 with the work engaging face 50 of the dog in the transverse position shown in full lines in Figs. 2, 4, and 8.

A second plunger 51 is slidably mounted in a horizontally extending bore 52 in the casing 32 in front of the axis 40 of the shaft 30. This plunger has a head 53 normally engaging an abutment surface 54 in the casing, the plunger being maintained in such abutting relation with the surface 54 by means of a relatively light coil spring 55 located between the left-hand end of the plunger (Figs. 8 and 9) and the left end wall 32' of the casing. As shown, the coil spring 55 extends into a recess 56 in the end of the plunger and is guided by a pin 57 projecting from the end wall of a casing. Movement of the plunger against the spring 55 serves merely to operate the stem 58 of an electric control switch 58' when it is desired to have an indication or other control operate whenever the dog 30 functions to move a workpiece as hereinafter more fully described.

A heavy coil spring 60 surrounds a portion of the plunger 51 and is located between an annular surface 62 formed by an enlargement in the bore 52 and a collar 63 which is slidably mounted in the other end of the enlarged bore. The collar 63 is normally pressed by the spring 60 against an abutment surface 64 in the casing which surface is located a short distance away from the adjacent end of the plunger head 53 as shown in Figs. 8 and 9. Thus, the plunger 51 is free to move toward the left as shown in Figs. 8 and 9 a short distance against the force of the spring 55 alone before it strikes the collar 63 and is opposed by the heavy spring 60. Thereafter, any movement of the plunger 51 toward the left is against the force of the light and heavy springs 55 and 60. As shown in the drawings, a control member 65 is carried on the collar 63 and engages the actuating stem 66 of an electric switch 68 which may be utilized in a suitable circuit to indicate or control other parts of the machine whenever the dog 30 rotates the shaft 31 sufficiently to compress spring 60.

During a portion of the forward or cutting stroke of the cutter head 13 (toward the left in Figs. 1 and 2) each dog is free to pivot in a counterclockwise direction (Figs. 2, 4, 5, and 8) against the force of the relatively light spring 45 to the position indicated in dotted lines at 30a in Figs. 8 and 12 wherein the dog slips past adjacent portions of a workpiece located either at the loading or cutting stations. A dotted line position 30b (Figs. 8 and 13) may be assumed by the dog while the machine is being set up so that the dog is out of the way. In this position the part 38' of the cylindrical portion 38 of the shaft 31 rides past the tip 49' of the transverse surface 49 on the plunger 42 and locks the plunger in the position shown in Fig. 13 so that the spring 45 is ineffective to return the dog 30 to its normal position shown in Fig. 8. It is necessary for the operator to release the dog from this position by turning the dog in a clockwise direction from the position shown in Fig. 13 sufficiently to permit the part 38' to enter the transverse slot 48 of the plunger after which the spring 45 is effective to return the dog to its normal position.

After the cutter head 13 has finished a cutting stroke the advance dog 25 is behind a lug or other suitable abutments 21' of the workpiece at the cutting station B and the trailing dog device 26 is behind a similar abutment 21' of a workpiece at the loading station A, both dogs having by then pivoted into the transverse or normally operative position shown in full lines in the drawings. Upon reversal of the cutter head and during the return movement thereof (towards the right in Figs. 1 and 2) the dogs engage the abutments 21' on the workpieces and thereafter operate to move the workpieces during the return movement of the cutter head. In the form illustrated herein, the dogs, during a normal work shifting movement, move to the dotted line position 30c of Fig. 8 against the relatively light spring 55 thereby operating the corresponding switch 58' which, as mentioned hereinbefore, may be effective in a circuit to indicate that a workpiece is being moved by the dog. The coil spring 60 is sufficiently strong to maintain the collar 63 in abutment with the surface 64 during normal movements of the workpieces in the machine. If, however, a workpiece meets with an obstruction the coil spring 60 will yield and permit the dog to move to the position 30d, thereby operating the switch device 68. Accordingly, switch device 68 is preferably included in a control circuit which will stop the cutter head movement under these circumstances. If when a workpiece meets an obstruction, the switch device 68 fails to effect a stoppage of the movement of the cutter head 13, the dog 30 moves clockwise from the position 30d of Fig. 8 to the position 30e shown in Figs. 8 and 11. In this position another part 38'' of the dog structure moves past the adjacent portion 51' of the plunger 51 and locks the plunger and dog in said position where it remains until released by the operator.

By locating two dog devices 25 and 26 as shown herein at opposite ends of the cutter head, the dog device 25 functions to remove a finished workpiece from the cutting station B simultaneously with operation of the dog device 26 to move a fresh workpiece from the loading station A to the cutting station B. It will therefore be readily apparent that with a proper supply of workpieces to the loading station A the machine can function automatically and repeatedly to operate on successive workpieces and to move successive workpieces automatically to the cutting station B and, after a cutting operation is performed thereon, away from the cutting station B.

We claim:

1. A machine having, in combination, a base having horizontally extending ways to receive a reciprocable tool head and adjacent guideways over which workpieces move from a loading station to a cutting station and then to a discharge station and are stopped at the cutting station during a cutting operation, a tool carrying head reciprocably mounted on said ways, means for moving said head in one direction from a starting position through a cutting stroke and toward the work loading station on said base and in a reverse direction to return the tool head to its starting position, and means carried on said tool head and engageable with a workpiece at the loading station and operable during the return movement of the tool head to move the workpiece from the loading station to the cutting station, said means comprising a dog pivoted on said head on an axis at substantially right angles to the direction of movement of the workpiece, a relatively light spring means normally effective against radial abutment means on said dog to retain the dog in a work engaging position transverse to said movement and yieldable a predetermined amount when work is moved to actuate a first control device and effect an indication that a workpiece is moving to the cutting station, and a heavier spring means operable to retain the dog in its work moving position and yieldable if the work meets an obstruction to permit the dog to actuate a second control device and stop movement of the tool head.

2. A machine as defined in claim 1 having a similar dog device carried on said head at a point spaced ahead of the first dog in the direction of work movement and operable during the return movements of the head to move finished workpieces out of the cutting station.

3. A machine having, in combination, a base having horizontally extending ways to receive a reciprocable tool head and adjacent guideways over which workpieces move from a loading station to a cutting station and then to a discharge station and are stopped at the cutting station during a cutting operation, a tool carrying head reciprocably mounted on said ways, means for moving said head in one direction from a starting position through a cutting stroke and toward the work loading station on said base and in a reverse direction to return the tool head to its starting position, a first dog device carried on said tool head and engageable with a workpiece at the loading station and operable during the return movement of the tool head to move the workpiece from the loading station to the cutting station, said first dog device comprising a dog pivoted on said head on an axis at substantially right angles to the direction of movement of the workpiece and yieldable means operable to retain the dog in its work moving position and yieldable if the work meets an obstruction to permit the dog to release the work, and a similar dog device carried on said head at a point spaced ahead of the first dog in the direction of work movement and operable during the return movements of the head to move finished workpieces out of the cutting station.

4. A machine having, in combination, a base having horizontally extending ways to receive a reciprocable tool head and adjacent guideways over which workpieces move from a loading station to a cutting station and then to a discharge station and are stopped at the cutting station during a cutting operation, a tool carrying head reciprocably mounted on said ways, means for moving said head in one direction from a starting position through a cutting stroke and toward the work loading station on said base and in a reverse direction to return the tool head to its starting position, and means carried on said tool head and engageable with a workpiece at the loading station and operable during the return movement of the tool head to move the workpiece from the loading station to the cutting station, said means comprising a dog pivoted on said head on an axis at substantially right angles to the direction of movement of the workpiece, a relatively light spring means normally effective against radial abutment means on said dog to retain the dog in a work engaging position transverse to said movement and yieldable a predetermined amount when work is moved to actuate a first control device, a heavier spring means operable to retain the dog in its work moving position and yieldable if the work meets an obstruction to permit the dog to actuate a second control device, and a third spring means effective in an opposite direction on said dog and yieldable to permit the dog to pivot to an inoperative position when passing a workpiece during the cutting stroke of the tool head.

5. A machine having, in combination, a base having horizontally extending ways to receive a reciprocable tool head and adjacent guideways over which workpieces move from a loading station to a cutting station and then to a discharge station and are stopped at the cutting station during a cutting operation, a tool carrying head reciprocably mounted on said ways, means for moving said head in one direction from a starting position through a cutting stroke and toward the work loading station on said base and in a reverse direction to return the tool head to its starting position, and means carried on said tool head and engageable with a workpiece at the loading station and operable during the return movement of the tool head to move the workpiece from the loading station to the cutting station said means comprising a dog movably supported on said head, a relatively light spring means normally effective against said dog to retain the dog in a work engaging position and yieldable a predetermined amount when work is moved to effect an indication that a workpiece is moving to the cutting station, a heavier spring operable to retain the dog in its work moving position and yieldable if the work meets an obstruction to permit the dog to release the work and actuate a control device.

6. A machine having, in combination, a base having horizontally extending ways to receive a reciprocable tool head and adjacent guideways over which workpieces move from a loading station to a cutting station and then to a discharge station and are stopped at the cutting station during a cutting operation, a tool carrying head reciprocably mounted on said ways, means for moving said head in one direction from a starting position through a cutting stroke and toward the work loading station on said base and in a reverse direction to return the tool head to its starting position, and means carried on said tool head and engageable with a workpiece at the loading station and operable during the return movement of the tool head to move the workpiece from the loading station to the cutting station, said means comprising a dog movably supported on said head, and yieldable means operable to retain the dog in its work moving position and yieldable if the work meets an obstruction to permit the dog to release the work.

7. A machine as defined in claim 6 wherein the work moving means includes a device yieldable during the cutting stroke of the tool head to permit the dog to pivot and slip past the succeeding workpiece, the path of movement of the tool head being parallel to that of the workpieces.

8. A machine having, in combination, a base having horizontally extending ways to receive a reciprocable tool head and adjacent guideways over which workpieces move from a loading station to a cutting station and then to a discharge station and are stopped at the cutting station during a cutting operation, a tool carrying head reciprocably mounted on said ways, means for moving said head in one direction from a starting position through a cutting stroke and toward the work loading station on said base and in a reverse direction to return the tool head to its starting position, and means carried on said tool head and engageable with a workpiece at the loading station and operable during the return movement of the tool head to move the workpiece from the loading station to the cutting station, said means comprising a dog movably supported on said head, a relatively light spring means normally effective against said dog to retain the dog in a work engaging position and yieldable a predetermined amount when work is moved to operate a control device and effect an indication that a workpiece is moving to the cutting station, and a heavier spring operable to retain the dog in its work moving position and yieldable if the work meets an obstruction to permit the dog to release the work and actuate another control device.

9. A machine as defined in claim 8 having a similar dog device carried on said head at a point spaced ahead of the first dog in the direction of work movement and operable during the return movements of the head to move finished workpieces out of the cutting station.

10. A machine having, in combination, a base having horizontally extending ways to receive a reciprocable tool head and adjacent guideways over which workpieces move from a loading station to a cutting station and then to a discharge station and are stopped at the cutting station during a cutting operation, a tool carrying head reciprocably mounted on said ways, means for moving said head in one direction from a starting position through a cutting stroke and toward the work loading station on said base and in a reverse direction to return the tool head to its starting position, and means carried on said tool head and directly engageable with a workpiece at the loading station and operable during the return movement of the tool head to contact and move the workpiece from the loading station to the cutting station.

11. A machine having, in combination, a base having horizontally extending ways to receive a reciprocable tool head and adjacent guideways over which workpieces move from a loading station to a cutting station and then to a discharge station and are stopped at the cutting station during a cutting operation, a tool carrying head reciprocably mounted on said ways, means for moving said head in one direction from a starting position through a cutting stroke and toward the work loading station on said base and in a reverse direction to return the tool head to its starting position, and means carried on said tool head and engageable with a workpiece at the loading station and operable during the return movement of the tool head to move the workpiece from the loading station to the cutting station, said means comprising a dog device having a casing secured to said tool head, a shaft rotatably supported in said casing on an axis extending transversely to the direction of tool head movement and carrying a dog on the outer end thereof normally extending transversely of the shaft axis and the direction of tool head movement for engagement with an abutment on a workpiece, a first plunger slidable in a bore in said casing and having a surface adapted to engage an opposed abutment surface formed on said shaft, a spring effective against said plunger and yieldable to permit the dog to pivot to an inoperative position when passing a workpiece during the cutting stroke of the tool head, a second plunger slidably mounted in a bore in said casing and having a surface effective against another opposed surface on said shaft, a relatively light spring opposing movement of said plunger and yieldable when the dog engages a workpiece to cause the plunger to effect operation of a control device, and a heavy spring means normally effective to prevent movement of said second plunger beyond the point required for operation of said control device and yieldable in the event the workpiece moved by the dog meets an obstruction to effect the operation of a second control device.

12. A machine having, in combination, a base having horizontally extending ways to receive a reciprocable tool head and adjacent guideways over which workpieces move from a loading station to a cutting station and then to a discharge station and are stopped at the cutting station during a cutting operation, a tool carrying head reciprocably mounted on said ways, means for moving said head in one direction from a starting position through a cutting stroke and toward the work loading station on said base and in a reverse direction to return the tool head to its starting position, and means carried on said tool head and engageable with a workpiece at the loading station and operable during the return movement of the tool head to move the workpiece from the loading station to the cutting station, said means comprising a casing carried on said tool head, a shaft rotatably mounted in said casing on a vertical axis, a dog on the upper end of said shaft and extending transversely of the direction of tool head movement to engage workpieces, a first plunger slidably mounted in a bore extending horizontally in said casing on one side of said shaft axis and having a surface engaging an opposed abutment on said shaft, a spring effective against said plunger to retain said dog in its normal transverse position and yieldable to permit the dog to slip past a workpiece during a cutting stroke of the tool head, a second plunger slidably supported in a horizontal bore in said casing on the opposite side of said shaft axis and having a surface engaging an opposed abutment on said shaft and having a head at one end thereof, a first switch device having its actuator in engagement with the head end of said second plunger, a relatively light spring intermediate the other end of said plunger and said casing, a second switch device in said casing, a collar surrounding said second plunger adjacent said head and normally abutting a surface on the casing spacing it from said head, a heavy coil spring operable between said collar and said casing to maintain the dog in its work moving position and yieldable when the work meets an obstruction, and a member carried by said collar normally engaging the actuator of said second switch device and movable to actuate the switch device when said heavy spring yields.

13. Work feeding apparatus for feeding workpieces from a loading station to a cutting station to be operated upon by a reciprocable tool carrying head, and then moved to a discharge station, comprising, a first control device, a second control device, a dog device carried on the head and engageable with a workpiece at the loading station for moving the workpiece to the cutting station upon return movement of the head, a dog pivoted on said dog device on an axis at substantially right angles to the direction of movement of the workpiece, a relatively light spring means normally effective against abutment means on said dog to retain the dog in a work engaging position transverse to said movement and yieldable a predetermined amount, when the workpiece is being moved, to actuate said first control device and effect an indication that a workpiece is moving to the cutting station, and a heavier spring means operable to retain the dog in its work moving position and yieldable if the workpiece meets an obstruction to permit the dog to actuate said second control device and stop movement of the tool carrying head.

14. Work feeding apparatus for feeding workpieces from a loading station to a cutting station to be operated upon by a reciprocable tool carrying head in a machine tool, and then moved to a discharge station, comprising, a casing fixed to said head to move therewith, a dog pivoted on said casing on an axis at substantially right angles to the direction of movement of the workpiece, spring means in said casing normally holding said dog in work moving position and yieldable if the work meets an obstruction to enable the dog to release the work, said casing and head at all times of movement of the head moving together as a unit.

15. Apparatus as claimed in claim 14, including locking means for locking said dog in said released position until the dog is moved manually in the opposite direction.

16. Work feeding apparatus for feeding workpieces from a loading station to a cutting station to be operated upon by a reciprocable tool carrying head, and then moved to a discharge station, comprising, a casing fixed to said head for movement therewith as a unit, a shaft rotatably supported in said casing, a dog fixed to said shaft and extending laterally therefrom into and out of the path of movement of the workpieces, a plunger in said casing, said plunger and shaft having interengageable shoulders, spring means connected with said plunger and normally biasing the dog into workpiece pushing position, said spring means being yieldable a substantial amount to enable the dog to swing into non-pushing position upon the application of a greater force to the dog.

17. Apparatus as claimed in claim 16, including a second plunger in said casing, said second plunger and shaft having interengageable shoulders, and spring means connected with said second plunger, whereby the second plunger and its spring means will permit swinging of the dog away from working engagement with the workpiece in one direction, and the first mentioned plunger and its spring means will permit swinging of the dog away from working engagement with the workpiece in the opposite direction.

18. Work feeding apparatus for feeding workpieces from a loading station to a cutting station to be operated upon by a movable tool head, and then moved to a discharge station, comprising, a casing movable with the tool head, a shaft rotatably mounted in said casing, a dog fixed to said shaft, a pair of laterally spaced apart plungers in said casing, said plungers and shaft having interengageable shoulders and said plungers being positioned on opposite sides of the shaft, and spring means on each of said plungers for yieldably holding the dog in workpiece pushing position.

19. Apparatus as claimed in claim 18, including a second lighter spring means on one of said plungers, whereby said lighter spring means will permit a slight movement of the dog when starting to push a workpiece, and the other spring means of the plunger having two spring means will permit movement of the dog by a greater force.

20. Apparatus as claimed in claim 19, including a first control device and a second control device, said first control device being operated upon movement of the last mentioned plunger against the force of the lighter spring means, and the second control device being operated upon movement of the two-spring means plunger against the force of its stronger spring means.

FRED R. SWANSON.
WALTER S. SWANSON.
ROBERT E. WILEY.

REFERENCES CITED

The following references are of record in the file of this patent:

UNITED STATES PATENTS

| Number | Name | Date |
| --- | --- | --- |
| 1,207,675 | Wood | Dec. 5, 1916 |
| 1,974,660 | Sinclair | Sept. 25, 1934 |
| 2,102,613 | Cole | Dec. 21, 1937 |
| 2,108,823 | Lyon | Feb. 22, 1938 |